United States Patent

Kaneko et al.

[11] Patent Number: 5,769,522
[45] Date of Patent: Jun. 23, 1998

[54] SURFACE LIGHT SOURCE DEVICE

[75] Inventors: Isamu Kaneko; Hideaki Katoh; Kazuaki Yokoyama, all of Saitama-ken; Tsuyoshi Ishikawa, Tokyo-to, all of Japan

[73] Assignee: Enplas Corporation, Kawaguchi, Japan

[21] Appl. No.: 685,841

[22] Filed: Jul. 24, 1996

Related U.S. Application Data

[63] Continuation of Ser. No. 294,535, Aug. 23, 1994, abandoned, which is a continuation-in-part of Ser. No. 910,746, Jul. 8, 1992, Pat. No. 5,414,599.

[30] Foreign Application Priority Data

Sep. 9, 1991  [JP]  Japan ................................. 3-80357 U
Nov. 28, 1991 [JP]  Japan ................................ 3-105342 U

[51] Int. Cl.⁶ .................................................. F21V 13/00
[52] U.S. Cl. .............................. 362/31; 362/26; 362/331; 362/337
[58] Field of Search ................................. 362/31, 26, 27, 362/331, 309, 330, 329, 339, 337, 308, 336, 268

[56] References Cited

U.S. PATENT DOCUMENTS

| | | | |
|---|---|---|---|
| 4,642,736 | 2/1987 | Masuzace et al. .......................... | 362/31 |
| 4,714,983 | 12/1987 | Lang .......................................... | 362/27 |
| 4,729,067 | 3/1988 | Ohe ........................................... | 362/31 |
| 4,791,540 | 12/1988 | Dreyer, Jr. et al. ...................... | 362/31 X |
| 4,974,122 | 11/1990 | Shaw ......................................... | 362/31 |
| 4,975,807 | 12/1990 | Obashi ...................................... | 362/26 X |
| 5,040,098 | 8/1991 | Tanaka et al. ............................. | 362/31 |
| 5,064,276 | 11/1991 | Endo et al. ................................ | 362/31 X |
| 5,136,480 | 8/1992 | Pristash et al. ........................... | 362/31 |
| 5,381,309 | 1/1995 | Borchardt ................................. | 362/31 |
| 5,394,255 | 2/1995 | Yokota et al. ............................ | 362/31 |
| 5,408,388 | 4/1995 | Kobayashi et al. ....................... | 362/31 |
| 5,442,523 | 8/1995 | Kashima et al. .......................... | 362/31 |

FOREIGN PATENT DOCUMENTS

| | | |
|---|---|---|
| 392863 | 10/1990 | European Pat. Off. . |
| 395344 | 10/1990 | European Pat. Off. . |
| 30346 | 5/1926 | France . |
| 2576441 | 1/1985 | France . |
| 3-69101 | 7/1991 | Japan . |
| 3-69184 | 7/1991 | Japan . |
| 4146401 | 5/1992 | Japan . |
| 5-25426 | 4/1993 | Japan . |
| 5-47923 | 6/1993 | Japan . |
| 315743 | 8/1929 | United Kingdom . |
| 325957 | 3/1930 | United Kingdom . |

*Primary Examiner*—Thomas M. Sember
*Attorney, Agent, or Firm*—Cushman Darby & Cushman IP Group of Pillsbury Madison & Sutro LLP

[57] ABSTRACT

A surface light source device comprising at least one light source, a transparent panel, a diffusing panel and a reflecting surface. This surface light source device is configured so that brightness is enhanced in a direction perpendicular to the diffusing panel by disposing, on the side of a front surface of the transparent panel, a transparent sheet which has protrusions having a saw-tooth-like sectional shape formed on one surface thereof.

16 Claims, 6 Drawing Sheets

ω  21  21a  22

23  24

5,769,522

SURFACE LIGHT SOURCE DEVICE

This is a continuation of application Ser. No. 08 /294, 535, filed on Aug. 23, 1994, which was abandoned, which is a CIP of application Ser. No. 07/910,746, filed Jul. 8, 1992, now U.S. Pat. No. 5,414,599 issued May 9, 1995.

BACKGROUND OF THE INVENTION a) Field of the Invention:

The present invention relates to a surface light source device which is to be used as a back light for liquid crystal display units, and more specifically to a surface light source device which uses a transparent panel member or a reflecting panel member.

b) Description of the Prior Art:

The conventional surface light source device which uses a transparent panel has a composition as illustrated in FIG. 1. In this drawing, the reference numeral 1 represents a light source, the reference numeral 2 designates a transparent panel, the reference numeral 3 denotes a diffusing panel and the reference numeral 4 represents a reflecting surface. The light source 1 used in this surface light source device is a linear light source which is, for example, a cold cathode ray tube and extends in the direction perpendicular to the paper surface. The transparent panel 2 is made of a glass material or a transparent plastic material. As a material for the transparent panel 2, it is generally known to select a plastic material such as acrylic resin which is light in weight and available at low cost. The transparent panel 2 has a form of a plane parallel plate which has a thickness t and a rectangular or square shaped surface. A light beam emitted from the linear light source 1 enters through an end surface of incidence 2a into the transparent panel 2 and travels through the transparent panel 2 as represented by a ray 10 in FIG. 1. During this travel, portions of the light beam emerge from the transparent panel 2 (upward in FIG. 1) and pass through the diffusing panel 3 to produce diffused rays. The surface light source device produces diffused rays which diverge from various points on the surface of the diffusing panel 3 (the upper surface shown in FIG. 1) as described above. The ray 10 shown in FIG. 1 is diverged at point A on the diffusing panel 3. In a case where the diffusing panel 3 is not be used, a ray which travels in a direction having an angle of γ indicated by an arrow has the highest brightness. The angle γ has a value which is different depending on the different refractive indices of different materials selected for the transparent panel 2. Experiments effected by selecting an acrylic resin having a refractive index of 1.49 indicated results that the angle γ has a value of approximately 75°. When the diffusing panel 3 is placed over the transparent panel 2 so that rays having passed through the diffusing panel 3 are diffused, deflection of the rays is corrected a little due to the diffusion of the rays, but brightness in the direction perpendicular to the transparent panel is not enhanced so remarkably. When a liquid crystal display panel, for example, is illuminated by using the surface light source device which uses the diffusing panel 3 placed over the transparent panel 2, brightness of the diffused rays is low in a direction for observation, i.e., in a direction having the angle γ=0°, whereas brightness of the diffused rays is the highest in an oblique direction having an angle γ≈75° which is deviated from the direction for observation. Accordingly, an observer of the liquid crystal display panel is undesirably obliged to observe an image which is relatively dark.

As another conventional example of the surface light source device which uses the transparent panel, there is also known the surface light source device illustrated in FIG. 2. In this conventional example, two linear light sources 1 are disposed beside both end surfaces of a transparent panel 7. In this device two light sources 1 are used to obtain a surface light source device which provides diffused rays having a relatively higher brightness.

Further, the transparent panel 7 of the surface light source device illustrated in FIG. 2 has a thinned central portion (the portion farthest from the light sources disposed on the right and left sides) and a top surface 7b which is inclined.

The surface light source device illustrated in FIG. 2 is configured so that light beams emitted from the right side and left side light sources 1 enter through end surfaces of incidence 7a, 7a of the transparent panel 7, and emerge out of a diffusing panel 3 so as to produce diffused rays. In the case of the surface light source device which has an inclined top surface 7b, rays emerging from the transparent panel 7, for example rays 10 and 11, have the highest brightness at an inclination angle which is a little smaller, or the angle γ has a value of approximately 60°. However, the surface light source device illustrated in FIG. 2 cannot provide the diffused rays which have sufficient brightness in the direction for observation and obliges observation of relatively dark images.

In addition, transparent panels having a thickness progressively thinned along a curve from an end surface of incidence are known, as are those which have a has thickness progressively thinned along curves from a plurality of end surfaces of incidence. Panels which are combined with a plurality of light sources and have a uniform thickness are also known.

SUMMARY OF THE INVENTION

A primary object of the present invention is to provide a surface light source device which comprises at least one light source, a transparent panel having at least one end surface of incidence disposed in the vicinity of the light source, a plurality of diffusing panels disposed on a top surface of the transparent panel-with a space reserved between the diffusing panels, and a reflecting surface disposed on a rear surface of the transparent panel.

Another object of the present invention is to provide a surface light source device which comprises at least one light source, a transparent panel having at least one end surface of incidence disposed in the vicinity of the light source, a diffusing panel disposed on a top surface of the transparent panel, a transparent sheet having, on one surface thereof, protrusions which have a saw-tooth-like sectional shape, and a reflecting surface disposed on a rear surface of the transparent panel.

The surface light source device according to the present invention enhances brightness in a direction perpendicular to the diffusing panels or panel by using two diffusing panels or transparent sheets having a surface on which saw-tooth-like protrusions are formed as described above.

The transparent sheet may have a form which has a large number of very small conical or pyramidal protrusions formed on one surface. Further, tips or vertices of the conical or pyramidal protrusions may be rounded.

Formed on one surface of the transparent sheet are rows of the protrusions which have the saw-tooth-like sectional shape.

In a particular case where the surface light source device according to the present invention is to be used as a back light for a liquid crystal display panel, it is preferable, for preventing stripe patterns from appearing on a display panel of the liquid crystal display unit, to configure the transparent sheet so that the rows of the top lines of the protrusions are oblique relative to bus lines or sides of a frame of the display panel.

Further, in the case where the transparent sheet has a large number of the conical or pyramidal protrusions, it is desirable that rows of the protrusions are oblique relative to the bus lines or the sides of the frame of the liquid crystal display panel as in the case described above.

It should be noted that it is sufficient to prevent the stripe patterns from appearing on a display panel so that the top lines of the protrusions or the rows of the protrusions are oblique only a little relative to the bus lines or sides of a frame of the display panel.

DETAILED DESCRIPTION OF THE PREFERRED EMBODIMENTS

Figure 3:
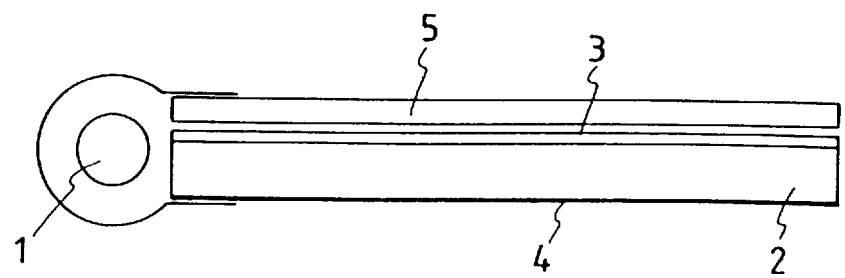
FIGS. 3 through FIG. 8 show sectional views illustrating the composition of first through sixth embodiments of the surface light source device according to the present invention.

The first embodiment of the surface light source device according to the present invention is illustrated in FIG. 3, wherein the reference numeral 1 represents a light source, the reference numeral 2 designates a transparent panel, the reference numeral 3 denotes a diffusing panel and the reference numeral 4 represents a reflecting panel. The first embodiment of the present invention has a composition which is substantially the same as that of the conventional surface light source device illustrated in FIG. 1. The reference numeral 5 represents a second diffusing panel which is adopted for enhancing brightness or luminance in the direction for observation (the direction perpendicular to the diffusing panels shown in FIG. 3). In other words, the second diffusing panel 5 serves for enhancing brightness in the direction for observation by further diffusing rays (or controlling directions of rays) travelling in the direction at the angle of γ shown FIG. 1 so that a portion of the ray is directed upward (in the direction for observation).

Figure 3A:
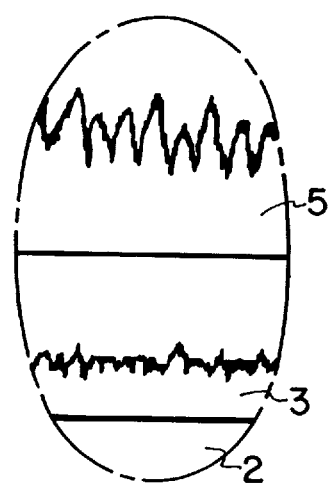

Both of diffusion panel 3 and 5 are made of either a transparent sheet or a transparent thin plate, in which a coarsened surface is arranged at least on the light emitting side surface of each panel. FIG. 3A shows the randomly varying coarsed surface of the diffusion panels 3, 5. The coarsened surface is formed on the panels in such a manner that fine unevenness (fine convex or concave portions) are formed on a transparent base plate in a random or regular manner by a mechanical, electrical or chemical method. Or, a printing method may be used to form a coarsened surface on the diffusion panels such that an ink including grains of foamed material, glass material or air foam is printed on the transparent base plate.

Such coarse condition for the diffusion plate 3, which is arranged on the transparent panel side is desired such that the depth of the unevenness is 10 micrometers or less, the distance of pitch of the unevenness is 100 micrometers or less, and the mean pitch is greater than the mean depth. Additionally, it is desired that a ratio between the mean depth and the distance of the mean pitch of the unevenness is 0.3 or less, more desirably 0.2 or less.

On the other hand, it is also desired to obtain the coarse condition for the diffusion plate 5, which is disposed on the light emitting side, such that the depth of the unevenness is 100 micrometers or less and the distance of pitch of the unevenness is also 100 micrometers or less but the mean distance of the pitch of the unevenness is smaller than the mean depth of the unevenness. Additionally, it is also desired that a ratio between the mean depth and the mean distance of pitch of the unevenness is within a range of 0.2–0.8, more desirably 0.3–0.5.

By disposing the diffusion panels 3 and 5 on the transparent panel 2 in a double manner, the light emitted from the transparent panel 2 having an angle of 70° is once diffused by the diffusing panel 3 and then directed in a direction perpendicular to the liquid crystal display panel by the diffusion panel 5 to provide a maximum brightness in an observing direction.

Figure 1:
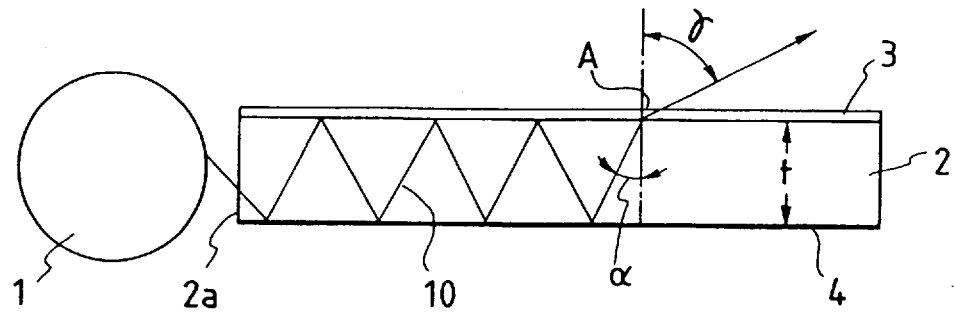
FIG. 1 shows a sectional view illustrating a composition of the conventional surface light source device.

Experiments which were effected for comparing the conventional surface light source device shown in FIG. 1 with the first embodiment of the present invention indicated results that brightness in the direction perpendicular to the diffusing panel 3 is approximately 25% higher in the case of the first embodiment of the present invention.

Figure 4:
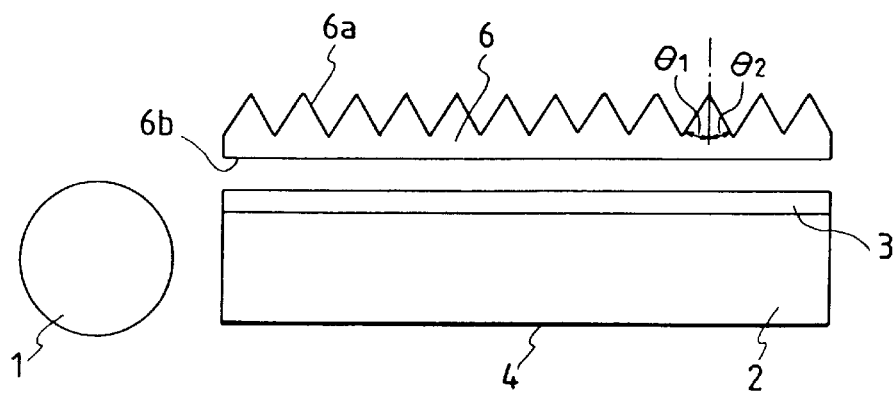

FIG. 4 shows the second embodiment of the present invention, wherein the second diffusing panel 5 used in the first embodiment is replaced with a transparent sheet 6 having a surface on which protrusions 6a having a sectional shape of saw teeth are formed in rows nearly parallel with one another are formed.

In the case of the second embodiment, rays which have emerged from the transparent panel 2 and passed through the diffusing panel 3 become diffused rays, which are refracted as a whole so as to be controlled in a direction perpendicular to the diffusing panel 3 by the surface having the saw-tooth-like protrusions 6a formed on the transparent sheet so as to enhance brightness in the direction perpendicular to the diffusing panel 3.

Experiments indicated that the second embodiment enhanced brightness approximately 50% in the direction of γ=0° as compared with the brightness available with the surface light source device illustrated in FIG. 1.

In the second embodiment described above, it is possible to omit the diffusing panel 3 by designing the surface of the transparent sheet 6 as a coarse surface though the brightness in the direction for observation is not enhanced all that much in this case.

Further, by disposing the second diffusing panel 5 above the transparent sheet 6, i.e. above the observation side, it is also possible to decrease the unevenness of the brightness.

In the second embodiment, a relationship between $\theta_1$ and $\theta_2$ shown in FIG. 4 may be $\theta_1 = \theta_2, \theta_1 < \theta_2$ or $\theta_1 > \theta_2$ for selecting a shape for the saw-tooth-like protrusions.

When $\theta_1$ is largely different from $\theta_2$, however, the saw-teeth-like protrusions will produce an undesirable influence on observation of images in a case of application where the second embodiment is used as a surface light source for illumination. Therefore, it is desirable that $\theta_1$ is equal or nearly equal to $\theta_2$. A transparent panel which has the saw-teeth-like protrusions designed for $\theta_1=\theta_2$ was used for the experiments which were effected for comparing the conventional surface light source device with the second embodiment of the present invention as described above. The conventional example using the transparent panel made of acrylic resin provided the angle of γ which was experimentally confirmed as 74.6° as described above. It is therefore considered that the angle α of the ray 10 shown in FIG. 1 is approximately 40°.

Accordingly, it is considered that rays which travel through the transparent panel like the ray 10 shown in FIG. I have the maximum intensity. So far as the angle a shown in FIG. 1 is kept unchanged, the angle γ has a value which is smaller as the transparent panel 2 has a smaller refractive index. Consequently, the angle γ has a smaller value and the brightness in the direction perpendicular to the diffusing panel 3 is enhanced as the transparent panel has a smaller refractive index in both the first and second embodiments of the present invention described above. On an assumption of α=40° it is possible to obtain γ=68.8° as understood from the formula shown below by using polymethylpentene (n =1.45) as a material for the transparent panel:

$$\sin \gamma = n \sin \alpha$$

The angle γ was approximately 69° in experiments effected by using a surface light source device which had the composition shown in FIG. 1 and used a transparent panel made of polymethylpentene.

In the first and second embodiments described above, usable as materials for the transparent panel are not only acrylic resin and polymethylpentene but also other materials so far as these materials have a high transparency and heat resistance. It is preferable to select, among these materials, one which has a low refractive index as a material for the transparent panel.

In the second embodiment described above, the transparent sheet is not limited to the one which has the protrusions which have the saw-tooth-like sectional shape and which are formed in rows on one surface thereof. For example, the transparent panel may have a large number of minute prism-like protrusions formed on one surface thereof. Further, conical shapes or pyramidal shapes may be selected in place of the prism-like shape.

Figure 5:
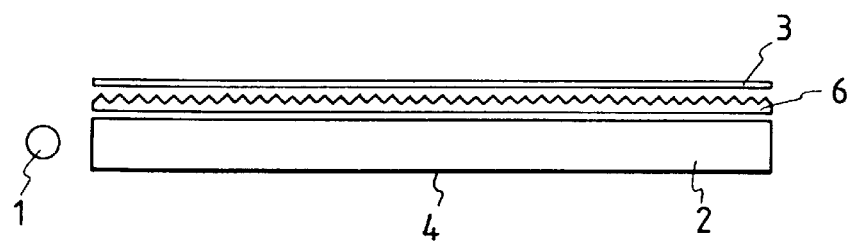

FIG. 5 shows the third embodiment of the surface light source device according to the present invention wherein a transparent sheet 6 which has protrusions 6a having saw-tooth-like sectional shape are formed on one surface thereof is disposed in the vicinity of a surface (the upper surface in FIG. 5) of the transparent panel and a diffusing panel 3 is disposed outside the transparent sheet 6.

The third embodiment of the present invention has an effect which is similar to that of the second embodiment of the present invention.

In this case, by disposing the second diffusion panel between the transparent sheet 6 and the transparent panel 2, the same effect can be obtained. It should be noted that in the following embodiments the same effect can be also obtained by disposing a second diffusion panel in the third embodiment.

Figure 2:
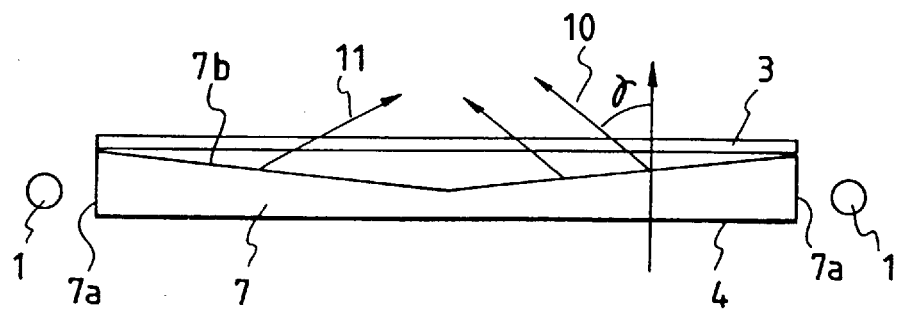
FIG. 2 shows a sectional view illustrating a composition of a different type of conventional surface light source device.
Figure 6:
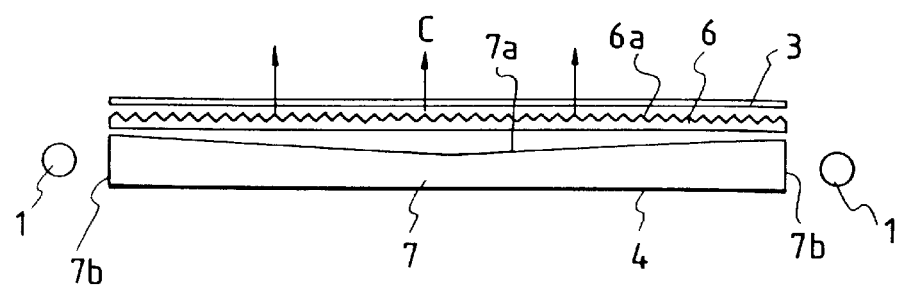

FIG. 6 illustrates the fourth embodiment of the surface light source device according to the present invention wherein the concept of the present invention is applied to the conventional surface light source device shown in Fig.2 so that brightness is enhanced in the direction perpendicular to the diffusing panel. Speaking concretely of the fourth embodiment, light sources 1 are disposed on both sides of a transparent panel 7 which has a thinned central portion, and a transparent sheet 6 which has protrusion 6a having saw-tooth-like sectional shape formed on one surface thereof and a diffusing panel 3 are disposed on the side of the surface 7a of the transparent panel as illustrated in FIG. 7.

In the fourth embodiment, light beams emitted from the light sources 1 and entering into the transparent panel 7 via the light incidence surfaces 7b, 7b are refracted a little upward by the surface 7a which is inclined relative to the bottom surface of the transparent panel 7, refracted further upward by the protrusions formed on the surface having the saw-tooth-like protrusions 6a of the transparent sheet 6 and pass through the diffusing panel 3, thereby becoming diffused rays. Accordingly, luminance of the diffused rays is enhanced in the direction C perpendicular to the diffusing panel 3 so as to assure brightness sufficient for observation.

Figure 7:
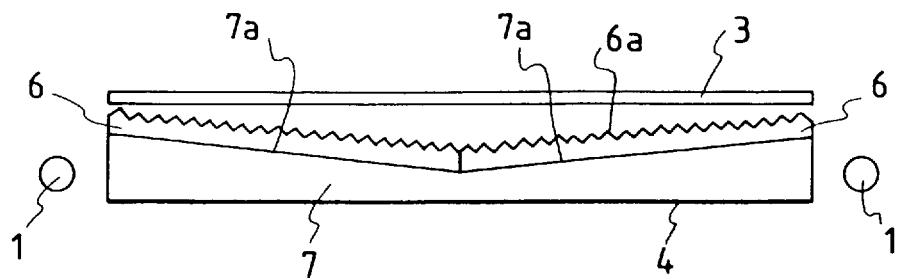

FIG. 7 illustrates the fifth embodiment of the surface light source device according to the present invention which consists of two light sources 1, a transparent panel 7 having a thinned central portion, two transparent sheets 6 which are disposed in contact with a surface 7a of the transparent panel 7 on which protrusions having saw-tooth-like sectional shape are formed, and a diffusing panel 3. Owing to this composition, the fifth embodiment has an effect which is similar to that of the fourth embodiment.

Figure 8:
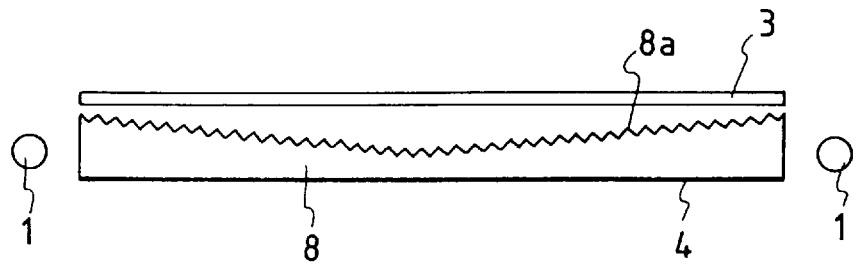

FIG. 8 illustrates the sixth embodiment of the surface light source device according to the present invention wherein a transparent panel 8 has a thinned central portion and an upper surface on which protrusions 8a having saw-tooth-like sectional shape are formed. The sixth embodiment consists of the two light sources 1, the transparent panel 8 having the surface on which the protrusions 8a having the saw-tooth-like sectional shape are formed and a diffusing panel 3. The sixth embodiment can provide an effect similar to those of the other embodiments without using a transparent sheet having the saw-tooth-like protrusions formed on one surface thereof.

Figure 9:
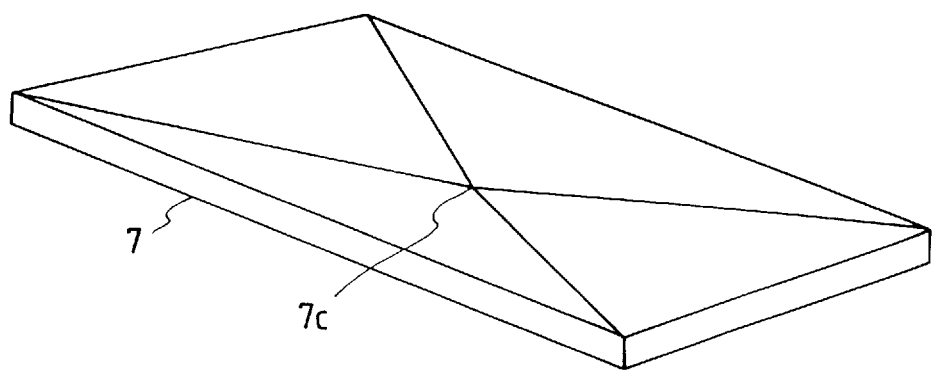
FIG. 9 shows a perspective view of a transparent panel which is thinned at a central portion thereof for use in a surface light source device equipped with four light sources disposed besides the four sides of the transparent panel.

FIG. 9 shows a transparent panel which has a thinned central portion and is to be used with the surface light source device equipped with four light sources disposed besides all four sides of the transparent panel 7.

The concepts of the fourth through the sixth embodiments shown in Fig.6 through FIG. 8 respectively are applicable also to the surface light source device using the transparent panel 7 illustrated in FIG. 9.

Figure 10:
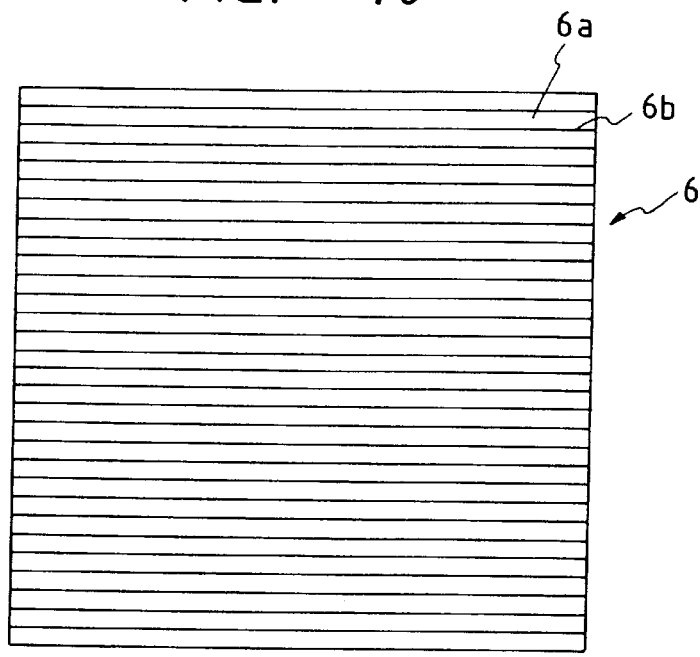
FIG. 10 shows a plan view of a transparent panel which is to be used in the surface light source device according to the present invention.
Figure 11:
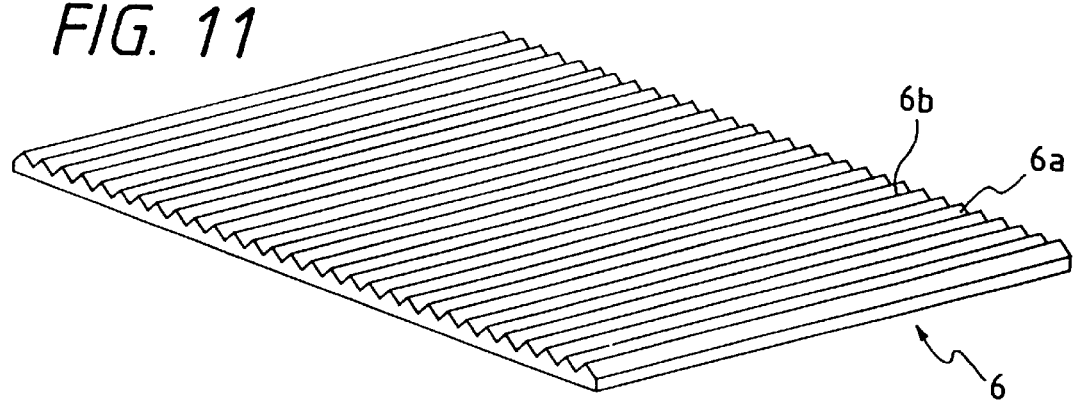
FIG. 11 shows a perspective view of the transparent sheet shown in FIG. 10.

Each of second through the fifth embodiments described above comprises a transparent sheet which has protrusions having saw-tooth-like sectional shape formed on one surface thereof. This transparent sheet has a sectional shape, for example, as in FIG. 4. A top view (of the transparent panel shown in FIG. 4) is illustrated in FIGS. 10 and 11 wherein rows of the top lines 6b of the protrusions having the saw-tooth-like sectional shape (or lows of the vertices of the protrusions having prism-like sectional shape) are arranged in parallel with one another.

Figure 12:
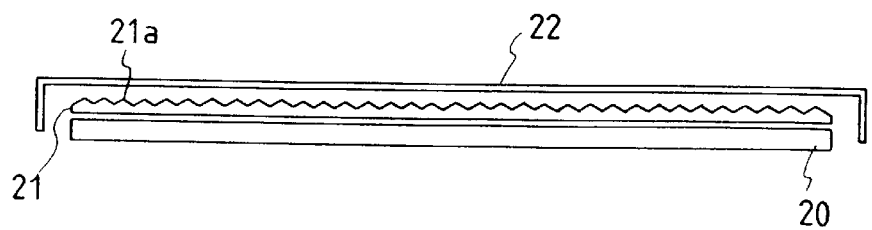
FIG. 12 shows a schematic sectional view illustrating an overall configuration of a combination liqud crystal display panel and the surface light source device according to the present invention used as a back light for the liquid crystal display panel.

FIG. 12 is a schematic sectional view illustrating a combination of a liquid crystal display panel and the surface light source device according to the present invention which is used as a back light for the liquid crystal display panel. In FIG. 12, the reference numeral 20 represents the surface light source device, the reference numeral 21 designates the transparent sheet which has protrusions having the saw-tooth-like sectional shape formed on one surface thereof and the reference numeral 22 denote the liquid crystal display panel.

When the surface light source device comprising the transparent sheet is used as a back light for the liquid crystal display panel as shown in FIG. 12, observation of images is hindered by stripe patterns which appear on the liquid crystal display panel.

Figure 13:
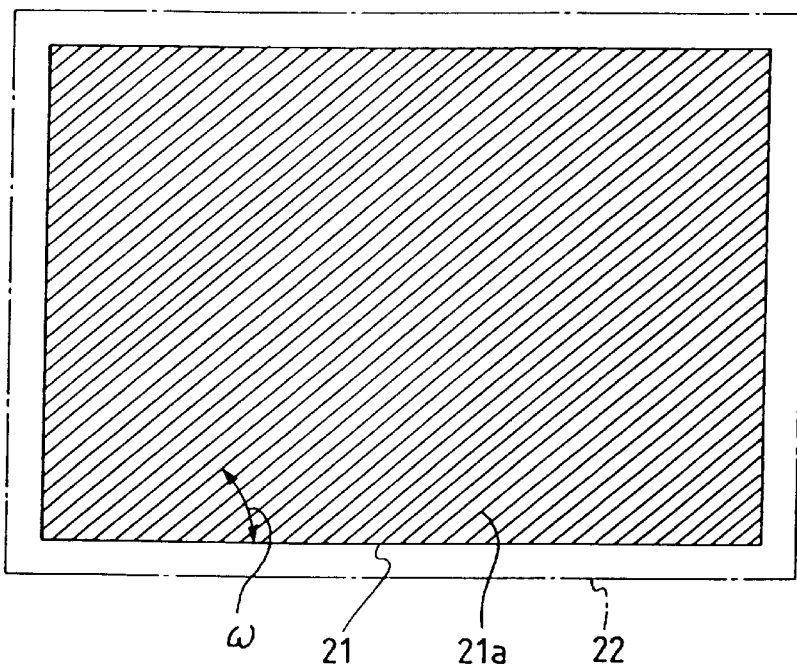
FIG. 13 shows a plan view illustrating the transparent sheet which has oblique rows of top lines of protrusions which have a saw-tooth-like sectional shape.
Figure 14:
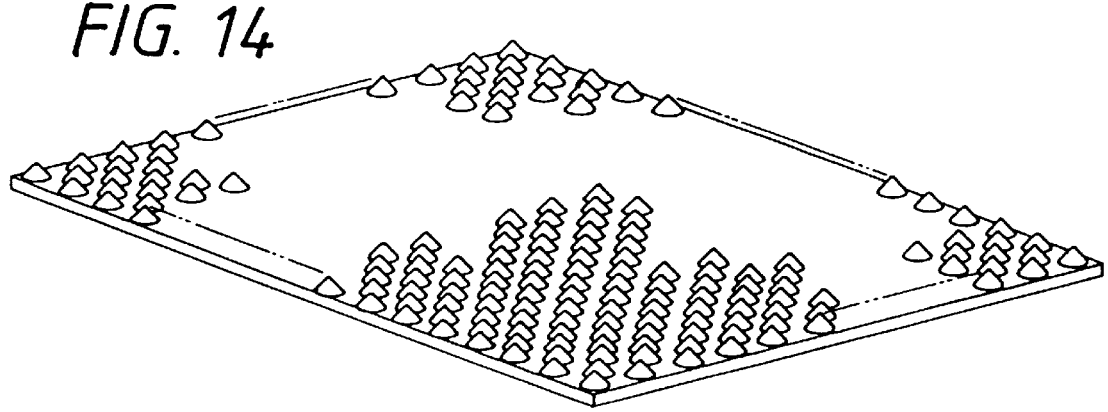
FIG. 14 shows a perspective view of the transparent sheet which has oblique rows of vertices of conical protrusions.

For correcting this defect, it is sufficient to configure the transparent sheet so that the rows of the top lines of the protrusions having the saw-tooth-like section shape are obliquely disposed as shown in FIG. 13. It should be noted that if the inclined angle ω of the top lines of the protrusions or the rows of the protrusions with respect to the bus lines of the liquid crustal display panel is not zero (ω≠0), the defect can be corrected. However, the effect will not be sufficiently obtained when the inclined angle ω is so small. Therefore, the angle should desirably be 45°. In place of the above transparent sheet (the transparent sheet as FIG. 13), the transparent sheet as shown in FIG. 14 may be used.

Figure 15:
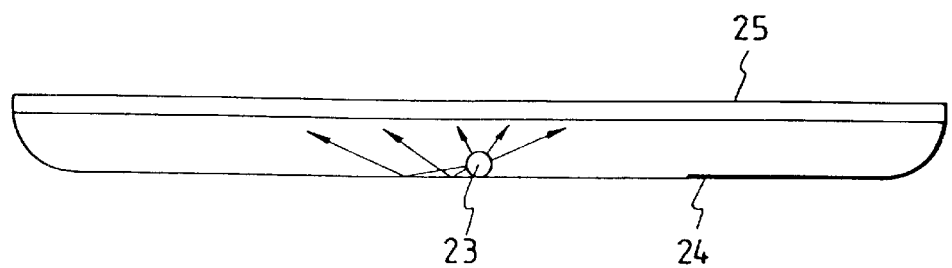
FIG. 15 shows a sectional view illustraing an example of a surface light source device wherein the transparent panel shown in FIG. 12 is utilized in a surface light source device of the type using a reflecting panel.

FIG. 15 illustrates a surface light source device which consists of a light source 23, a reflecting panel 24 and a diffusing panel 25, and is configured so that some of the light beams emitted from the light source 23 travel directly to the diffusing panel 25, whereas others of the light beams are reflected by the reflecting panel 24 and then directed toward the diffusing panel 25, whereby distribution of luminace is relatively uniform over the diffusing panel 25. In case of the surface light source device shown in FIG. 15, brightness can be enhanced in the direction perpendicular to the diffusing panel 25 by equipping the diffusing panel 25 with the transparent sheet which is adopted in the embodiments of the surface light source device according to the present invention.

We claim:

1. A surface light source device comprising:

a transparent panel made of a transparent material and having a rectangular shaped surface;

at least one linear light source disposed in a vicinity of at least one edge of said transparent panel;

a reflecting surface disposed on a rear surface of said transparent panel; and a plurality of diffusing members including:
      a first diffusing member made of a transparent material and having at least one randomly varying coarsened surface having a first randomly varying unevenness of a first depth, said first diffusing member being disposed adjacent a light emitting surface of said transparent panel, and
      a second diffusing member made of a transparent material and having at least one randomly varying coarsened surface having a second randomly varying unevenness of a second depth larger than said first depth;

said first diffusing member being disposed between said second diffusing member and said transparent panel.

2. A surface light source device according to claim 1, wherein:

said first depth of said first random unevenness is no greater than about 10 micrometers; and a pitch of said first random unevenness is no greater than about 100 micrometers.

3. A surface light source device according to claim 2, wherein:

a mean of said pitch of said first random unevenness is greater than a mean of said first depth of said first random unevenness.

4. A surface light source device according to claim 1, wherein:

said second depth of said second random unevenness is no greater than about 100 micrometers; and a pitch of said second random unevenness is no greater than about 100 micrometers.

5. A surface light source device according to claim 4, wherein:

a mean of said pitch of said second random unevenness is less than a mean of said second depth of said second random unevenness.

6. A surface light source device according to claim 1, 2, 3, 4 or 5, wherein:

said transparent panel has a quadrilateral shape; and said at least one linear light source comprises two linear light sources disposed respectively in a vicinity of first and second opposite edges of said transparent panel.

7. A surface light source device according to claim 6, wherein:

a thickness of said transparent panel is thicker at each of said first and second opposite edges than at a center portion of said transparent panel, and said transparent panel gradually thins in thickness between each of said first and second opposite edges and said center portion.

8. A surface light source device according to claim 1, 2, 3, 4 or 5, wherein:

said transparent panel has a quadrilateral shape; and said at least one linear light source comprises four linear light sources each disposed in a vicinity of a respective edge of said transparent panel.

9. A surface light source device according to claim 8, wherein:

a thickness of said transparent panel is thickest at each of said respective edges thereof, and said transparent panel is thinnest at a center portion thereof.

10. A surface light source device according to claim 1, 2, 3 or 4, wherein:

one only linear light source is disposed in a vicinity of said transparent panel.

11. A surface light source device according to claim 10, wherein:

a thickness of said transparent panel is thicker at said at least one edge where said one only linear light source is disposed than at another edge of said transparent panel opposite said at least one edge.

12. A surface light source device comprising:

a transparent panel made of a transparent material;

a light source disposed in a vicinity of at least one edge of said transparent panel;

a reflecting surface disposed on a rear surface of said transparent panel;

a first diffusing member made of a transparent material having a randomly varying coarsened surface of a first randomly varying unevenness having a first depth, said first diffusing member being disposed adjacent a light emitting surface of said transparent panel; and a second diffusing member made of a transparent material having a randomly varying coarsened surface of a second randomly varying unevenness having a second depth larger than said first depth;

said first diffusing member being disposed between said second diffusing member and said transparent panel.

13. A surface light source device according to claim 12, wherein:

said first depth of said first random unevenness is no greater than about 10 micrometers; and a pitch of said first random unevenness is no greater than about 100 micrometers.

14. A surface light source device according to claim 12, wherein:

said second depth of said second random unevenness is no greater than about 100 micrometers; and a pitch of said second random unevenness is no greater than about 100 micrometers.

15. A surface light source device according to claim 13, wherein a mean of said pitch of said first random unevenness is greater than a mean of said first depth of said first random unevenness.

16. A surface light source device according to claim 14, wherein a mean of said pitch of said second random unevenness is less than a mean of said second depth of said second random unevenness.

* * * * *